(12) United States Patent
Chen et al.

(10) Patent No.: US 10,107,032 B2
(45) Date of Patent: Oct. 23, 2018

(54) CONTROL MECHANISM FOR RAISING AND LOWERING WINDOW COVERING

(71) Applicant: NIEN MADE ENTERPRISE CO., LTD., Taichung (TW)

(72) Inventors: Lin Chen, Taichung (TW); Keng-Hao Nien, Taichung (TW)

(73) Assignee: NIEN MADE ENTERPRISE CO., LTD., Taichung (TW)

( * ) Notice: Subject to any disclaimer, the term of this patent is extended or adjusted under 35 U.S.C. 154(b) by 96 days.

(21) Appl. No.: 15/184,802

(22) Filed: Jun. 16, 2016

(65) Prior Publication Data
US 2017/0218698 A1 Aug. 3, 2017

(30) Foreign Application Priority Data
Jan. 29, 2016 (CN) ..................... 2016 2 0093383 U

(51) Int. Cl.
| | | |
|---|---|---|
| *E06B 9/322* | (2006.01) | |
| *E06B 9/34* | (2006.01) | |
| *F16H 19/06* | (2006.01) | |
| *F16H 29/12* | (2006.01) | |
| *E06B 9/304* | (2006.01) | |
| *E06B 9/307* | (2006.01) | |
| *E06B 9/80* | (2006.01) | |
| *E06B 9/388* | (2006.01) | |

(52) U.S. Cl.
CPC ............. *E06B 9/322* (2013.01); *E06B 9/304* (2013.01); *E06B 9/307* (2013.01); *E06B 9/34* (2013.01); *F16H 19/06* (2013.01); *F16H 29/12* (2013.01); *E06B 9/388* (2013.01); *E06B 2009/807* (2013.01)

(58) Field of Classification Search
CPC ... E06B 9/322; E06B 9/78; E06B 9/50; E06B 2009/785; F16H 19/06; F16H 29/12
USPC ...................... 160/300–303, 304.1, 308, 321
See application file for complete search history.

(56) References Cited

U.S. PATENT DOCUMENTS

| | | | | |
|---|---|---|---|---|
| 222,204 | A | * | 12/1879 | Shaw |
| 256,736 | A | * | 4/1882 | Putnam |
| 271,691 | A | * | 2/1883 | Quillfeldt |
| 278,037 | A | * | 5/1883 | Noyes |
| 2,134,405 | A | * | 10/1938 | Hulshizer ............. E21B 19/081 173/156 |

(Continued)

*Primary Examiner* — Robert Canfield
(74) *Attorney, Agent, or Firm* — Lynette Wylie; Apex Juris, PLLC.

(57) ABSTRACT

A control structure for a window covering includes a base, a revolving wheel having an axial post, a restriction means including a bushing fitting around the axial post, a transmission member provided on a side of the bushing, and at least one pawl connected to the axial post. The revolving wheel is connected to the base. The restriction means has at least one cutting groove. The transmission member has at least one abutting portion on an inner wall thereof. The pawl is pivotable within a width of the cutting groove. When the revolving wheel is rotated forward, an end of the pawl passes through the cutting groove to mesh with the abutting portion. When the revolving wheel is rotated backward, the pawl disengages from the abutting portion, and the transmission member is rotatable relative to the revolving wheel. Whereby, it could prevent generating noise while operating the window covering.

12 Claims, 16 Drawing Sheets

(56) References Cited

U.S. PATENT DOCUMENTS

| | | | | |
|---|---|---|---|---|
| 4,346,749 A * | 8/1982 | Singletary | ............ | E06B 9/90 160/301 |
| 5,494,093 A * | 2/1996 | Eiterman | ............ | E05D 13/003 160/300 |
| 7,455,157 B2 * | 11/2008 | Kimes | ............ | F16D 41/12 192/108 |
| 9,739,089 B2 * | 8/2017 | Smith | ............ | E06B 9/60 |
| 2012/0048485 A1 * | 3/2012 | Fu-Lai | ............ | E06B 9/322 160/331 |

* cited by examiner

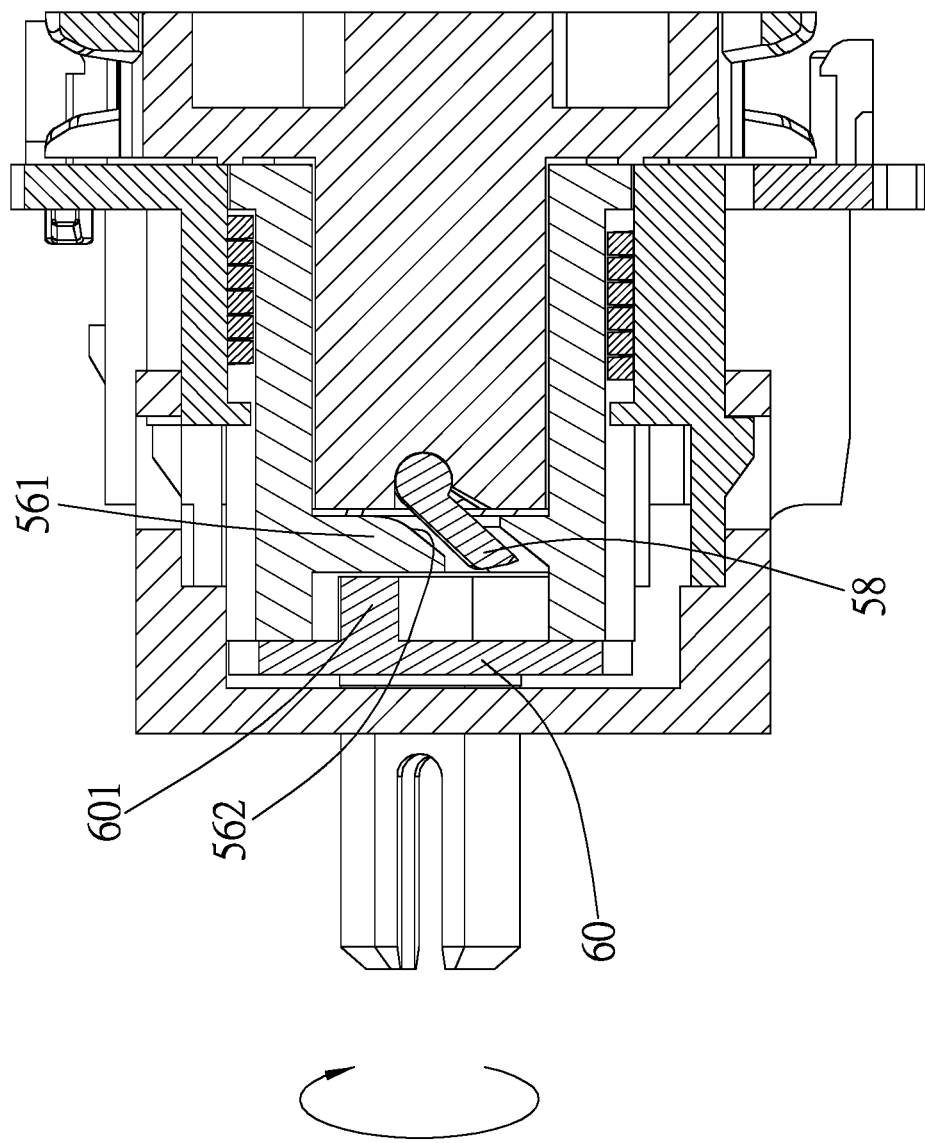

CONTROL MECHANISM FOR RAISING AND LOWERING WINDOW COVERING

The current application claims a foreign priority to application number 201620093383.6 filed on Jan. 29, 2016 in China.

BACKGROUND OF THE INVENTION

1. Technical Field

The present invention generally relates to structures of window coverings, and more particularly to a control structure for raising and lowering a window covering.

2. Description of Related Art

A conventional window covering includes a headrail, a bottom rail, and a shade material located between the headrail and the bottom rail, and at least two lifting cords pass through the shade material. The window covering further includes a control structure, which rotates a shaft to roll up or release the lifting cords to collapse or expand the shade material.

Such conventional control structure uses a ratchet, which provides a clutch function, to rotate the shaft provided in the headrail forwards or backwards, and consequently, the lifting cords wound around the shaft are pulled or released to collapse or expand the shade material. However, during the process of controlling the control structure to collapse or to expand the shade material, the components of the ratchet tend to collide with each other and generate disturbing noise.

In addition, the conventional ratchet includes a pawl having a sloped surface, while each tooth of the corresponding gear also has a sloped surface, so that the pawl and the gear can either mesh or interlock with each other, whereby the ratchet only has one permitted direction. However, the pawl in this kind of structure is usually turned by gravity. In other words, the pawl could be reversely turned, while the pawl is rotated forwards or backwards, or stays at a lower position, such that the conventional ratchet is not reliable.

BRIEF SUMMARY OF THE INVENTION

In view of the reasons mentioned above, the primary objective of the present invention is to provide a control structure for raising and lowering a window covering, which is helpful to raise or lower the window covering smoothly and reliably; furthermore, the noise generated during the process of raising or lowering the window covering could be decreased.

The present invention provides a control structure for raising and lowering a window covering, which includes a headrail, a bottom rail, and a shade material, wherein the shade material is provided between the headrail and the bottom rail, and is expanded or collapsed by a shaft provided in the headrail. The control structure includes a base, a revolving wheel, a transmission member, at least one pawl, and a restriction means. The base is provided in the headrail. The revolving wheel is connected to the base, wherein the revolving wheel is rotated forwards and backwards, and has an axial post. The transmission member is connected to the shaft, and is provided on the axial post, wherein the transmission member has at least one abutting portion on a wall thereof. The pawl is pivotally provided between the transmission member and the axial post, wherein when the revolving wheel is rotated forward, the pawl meshes with the abutting portion; when the revolving wheel is rotated backward, the pawl disengages from the abutting portion. The restriction means is for keeping the pawl disengaging with the abutting portion.

In an embodiment, the transmission member includes a cover. The restriction means includes a bushing, which is provided in the cover and fitting around the axial post. The bushing has at least one cutting groove. One end of the pawl is pivotally provided on the axial post, while another end thereof extends and passes through the cutting groove. When the revolving wheel is rotated backward over a longer distance than the bushing is, the pawl goes into the cutting groove, and disengages with the corresponding abutting portion, so that the cover bearing the weight of the shade material through the shaft is freely rotated relative to the revolving wheel.

In an embodiment, the axial post of the revolving wheel has at least one engaging groove provided in an axial direction thereof, and the engaging groove has a curved bottom. The pawl has a root located in the engaging groove, and a shape of the root matches a shape of the curved bottom of the corresponding engaging groove, so that the pawl is able to pivot within a width of the corresponding cutting groove.

In an embodiment, the bushing further has a notch. The axial post of the revolving wheel has a prominent rib provided thereon. The prominent rib engages with the notch of the bushing, and pushes against one of two sidewalls of the notch along with a forwards or backwards rotation of the revolving wheel to rotate the bushing.

In an embodiment, the control structure further includes a spring fitting around the bushing, wherein the base has an axial bore, and the axial post of the revolving wheel passes through the axial bore. The axial bore of the base has a flange at a front edge thereof, and one end of the spring pushes against the flange, while another end thereof extends into the notch to hook the prominent rib.

In an embodiment, the transmission member includes a cover. The restriction means includes a bushing, which is provided in the cover fitting around the axial post. Two ends of the bushing individually have at least one cutting groove. The axial post of the revolving wheel has at least one engaging groove. The pawl is pivotally provided on the bushing, and is able to pivot in the cutting groove. Two opposite sides of the pawl respectively have a guide portion and a mesh portion formed thereon. When the revolving wheel is rotated backward for a longer distance than the bushing is, the pawl pivots to go into the corresponding cutting groove, so that the guide portion leaves the corresponding engaging groove, and the mesh portion disengages from the corresponding abutting portion. At the same time, the cover bearing the weight of the shade material through the shaft is freely rotated relative to the revolving wheel. When the revolving wheel is rotated forward, the guide portion of the pawl goes into the engaging groove, and the mesh portion of the pawl meshes with the abutting portion, so that the rotated revolving wheel rotates the cover through the pawl.

In an embodiment, the bushing further has a notch. The axial post of the revolving wheel has a prominent rib provided thereon. The prominent rib engages with the notch of the bushing, and pushes against one of two sidewalls of the notch along with a forwards or backwards rotation of the revolving wheel to rotate the bushing.

In an embodiment, the control structure further includes a spring fitting around the bushing, wherein the base has an axial bore, and the axial post of the revolving wheel passes through the axial bore. The axial bore of the base has a flange at a front edge thereof, and one end of the spring pushes against the flange, while another end thereof extends into the notch to hook the prominent rib.

In an embodiment, the pawl is pivotally provided on the bushing through an axial member, which is located closer to the mesh portion than to the guide portion.

In an embodiment, the transmission member includes a rotating plate, and one side of the rotating plate has at least one rib formed as the abutting portion. The restriction means includes a bushing, which is located on the side of the rotating plate, and includes at least one bore corresponding to the rib. One end of the pawl is pivotally provided on the axial post, while another end thereof extends and passes through the bore; when the revolving wheel is rotated backward over a longer distance than the bushing is, the pawl goes into the bore, and disengaged from the rib, so that the rotating plate bearing the weight of the shade material through the shaft is rotated freely relative to the revolving wheel.

In an embodiment, the axial post of the revolving wheel has at least one engaging groove, and the engaging groove is formed by a recess of an end surface of the axial post, and has a curved bottom. An inner wall of the bushing has a top plate provided thereon, and the bore is provided on the top plate. The pawl has a root located in the engaging groove, and a shape of the root matches a shape of the curved bottom of the corresponding engaging groove, so that the pawl is adapted to pivot within a width of the corresponding bore.

In an embodiment, the bushing further has a notch. The axial post of the revolving wheel has a prominent rib provided thereon. The prominent rib engages with the notch of the bushing, and pushes against one of two sidewalls of the notch along with a forwards or backwards rotation of the revolving wheel to rotate the bushing.

The purpose of the present invention is utilizing the restriction means to ensure the position of the pawl, such that the window covering could be raised and lowered smoothly, and it could be also reduced the noise generated during the process of collapsing or expanding the shade material.

BRIEF DESCRIPTION OF THE SEVERAL VIEWS OF THE DRAWINGS

The present invention will be best understood by referring to the following detailed description of some illustrative embodiments in conjunction with the accompanying drawings, in which:

FIG. 16 is a sectional view similar to FIG. 15, which presents the pawls disengage from the ribs of the transmission member, while the revolving wheel is rotated backward.

DETAILED DESCRIPTION OF THE INVENTION

Figure 1:
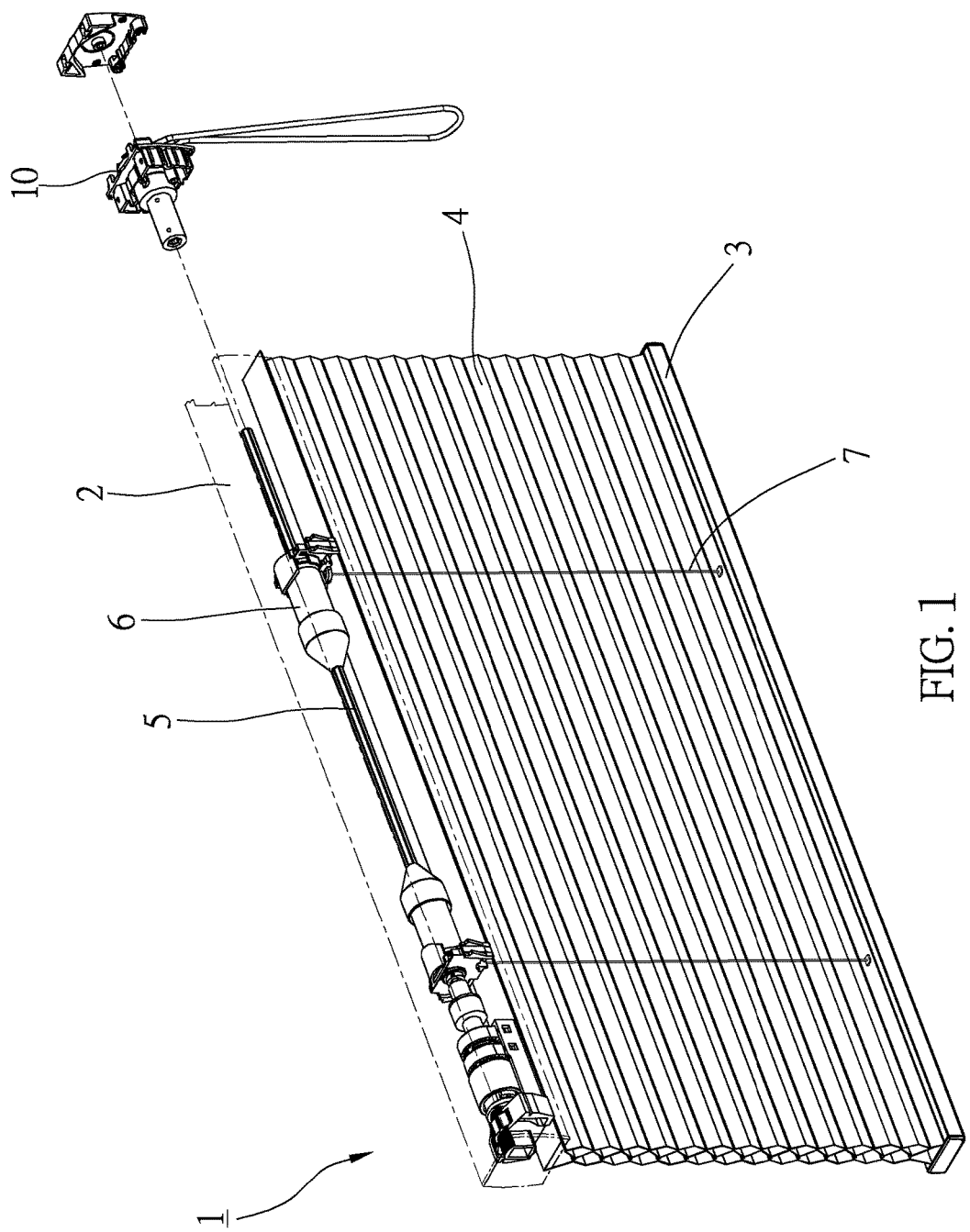
FIG. 1 is a schematic view of a control structure according to a first preferred embodiment of the present invention.
Figure 2:
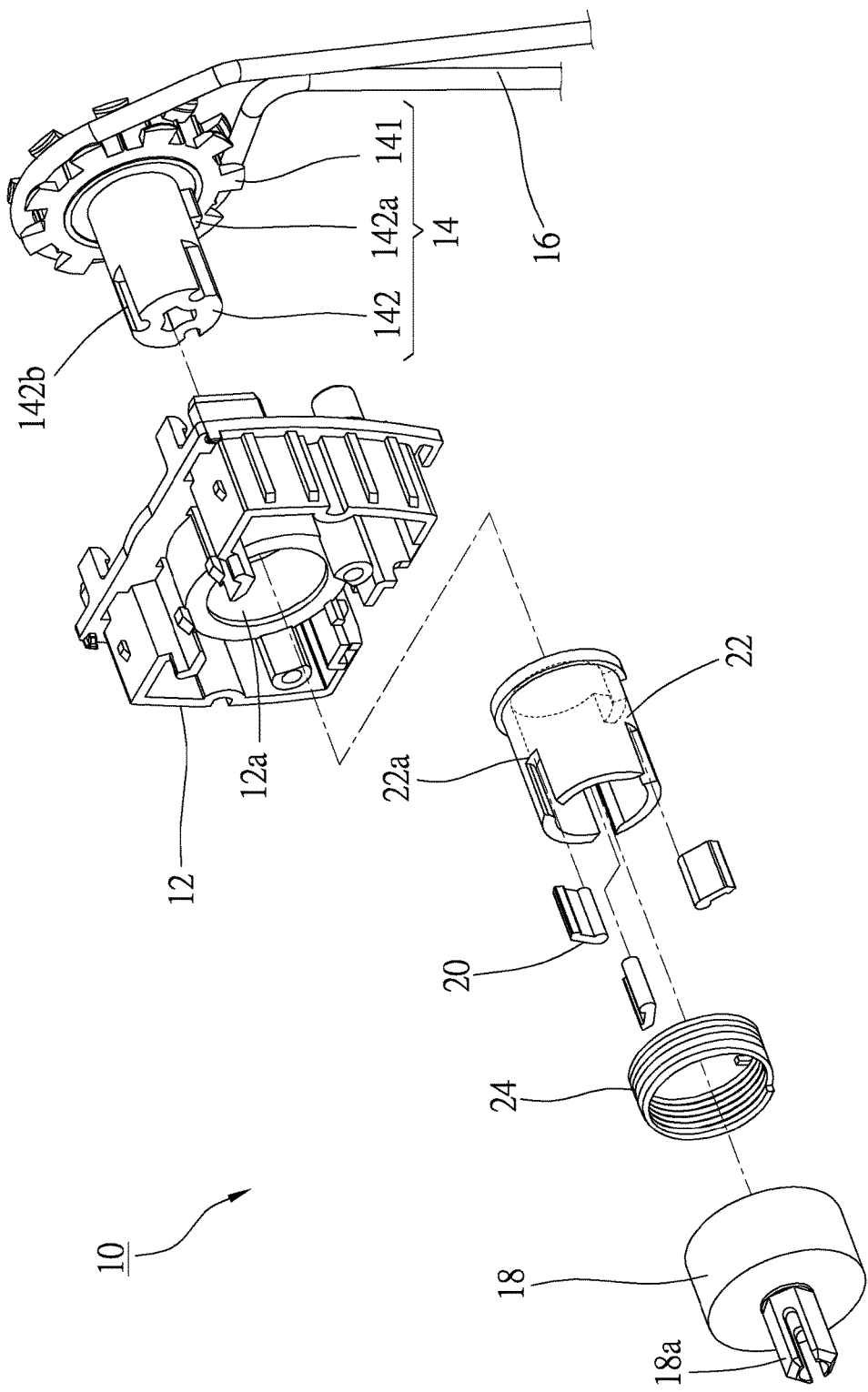
FIG. 2 is an exploded view of the control structure as shown in FIG. 1.
Figure 3:
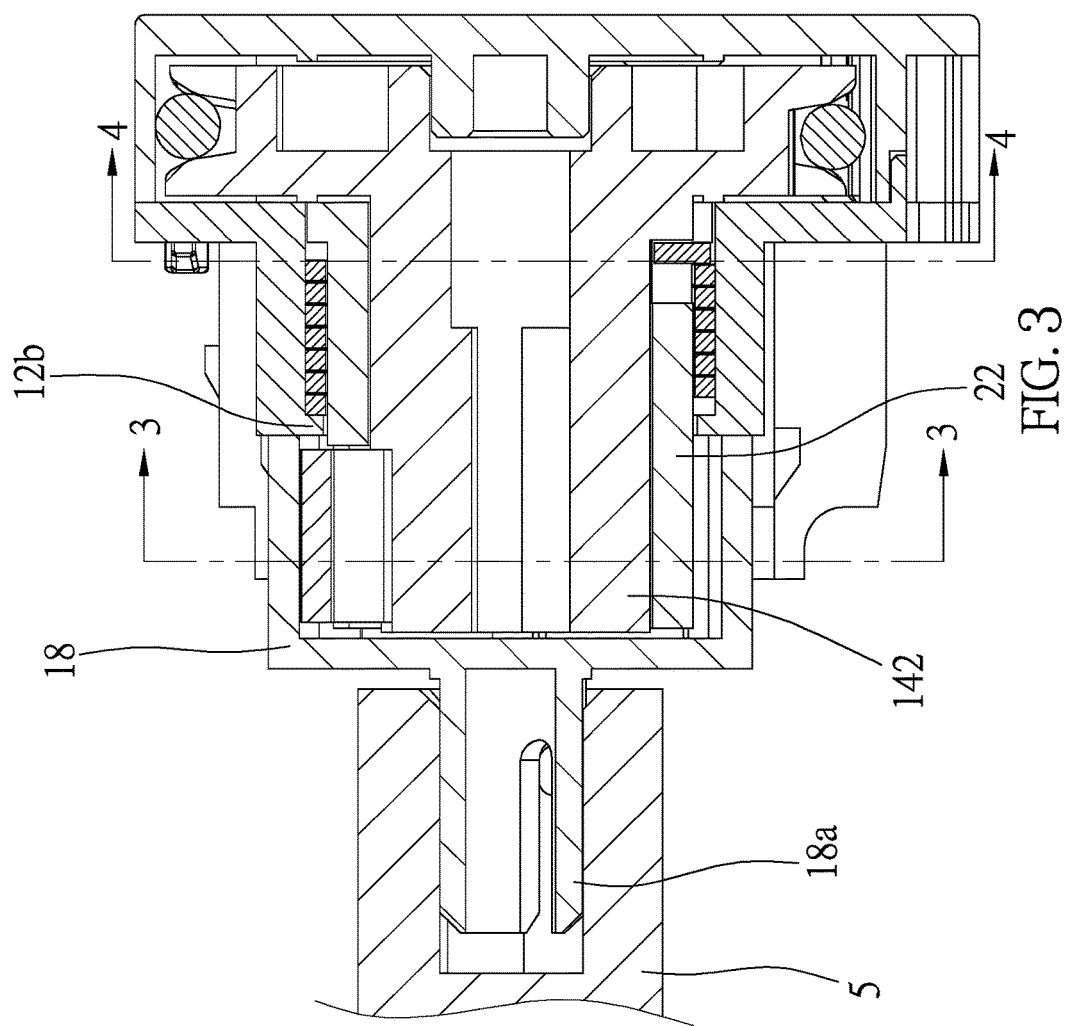
FIG. 3 is a sectional view which presents a revolving wheel, a cover, and a base of the control structure in FIG. 1.

A window covering 1, including a control structure 10 according to the first preferred embodiment of the present invention, is illustrated in FIG. 1. The window covering 1 includes a headrail 2, a bottom rail 3, a shade material 4, a shaft 5, two reels 6, and two lifting cords 7. The shade material 4 is located between the headrail 2 and the bottom rail 3. The shaft 5 is provided in the headrail 2, and is rotated forwards and backwards by the control structure 10. Each of the reels 6 is engaged with the shaft 5. Each of the lifting cords 7 is fixedly connected to one of the reels 6 with one end of the reels 6, and could be wound around the connected reel 6, while another end thereof is fixedly connected to the bottom rail 3 after passing through the headrail 2 and the shade material 4. When the shaft 5 is rotated, the lifting cords 7 wound around the reels 6 could be consequently pulled or released, so as to collapse or expand the shade material 4. In FIG. 1, though the shade material 4 is a cellular shade, however, the shade material could also be a drape or a composition of multiple slats in practice.

As shown in FIG. 1 to FIG. 4, the control structure 10 in the first preferred embodiment is installed on a side of the headrail 2, and includes a base 12, a revolving wheel 14, a rope 16, a transmission member being a cover 18 as an example, three pawls 20, a restriction means being a bushing 22 as an example, and a spring 24.

The base 12 has an axial bore 12a which has a flange 12b at a front edge thereof. The revolving wheel 14 includes a rope sheave 141 and an axial post 142, wherein the rope 16 fits in the rope sheave 141, and the rope sheave 141 could be controlled by the rope 16 to rotate forward (i.e., clockwise) or backward (i.e., counter-clockwise). In the first preferred embodiment, the rope 16 is a round rope. However, the rope could be a bead chain in other embodiments.

The axial post 142 is engaged with the rope sheave 141, and extends in an axial direction. The axial post 142 passes through the axial bore 12a of the base 12. The axial post 142 has a prominent rib 142a near the rope sheave 141, and three engaging grooves 142b provided on a circular surface of the axial post 142 and on a side opposite to the prominent rib 142a, wherein the engaging grooves 142b are equally spaced in a radial direction, and are recessed into the circular surface. Each of the engaging grooves 142b has a curved bottom.

The cover 18 rotatably fits around the axial post 142, and has an extended portion 18a extended outward to engage with the shaft 5. Three abutting portions are provided on a circular inner surface of the cover 18. For example, the abutting portions are one-way teeth 18b. The one-way teeth 18b are equally spaced on the circular inner surface of the cover 18.

Each of the pawls 20 has a root 20a. The roots 20a are respectively engaged with one of the engaging grooves 142b of the axial post 142. The shape of each of the roots 20a matches the curved bottom of each of the engaging grooves 142b, so that each of the pawls 20 is pivotable after being engaged with the axial post 142. Furthermore, each of the pawls 20 could pivot following the rotation of the revolving wheel 14.

Figure 5:
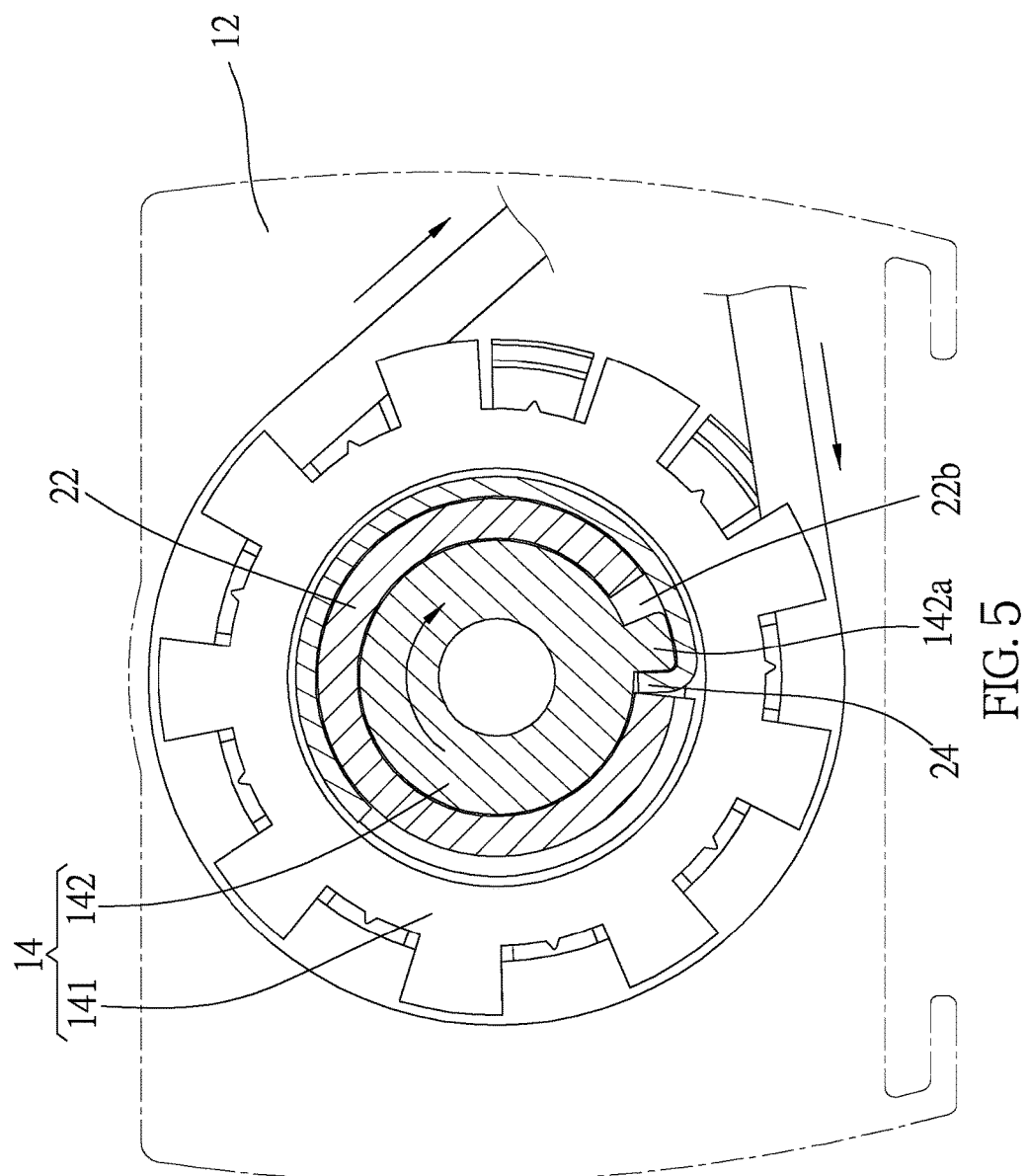
FIG. 5 is a sectional view along the 4-4 line in FIG. 3, which presents one of the ends of the spring pushes against one of the sidewalls of the notch by pushing a prominent rib.

The bushing 22 rotatably fits around the axial post 142 of the revolving wheel 14, and is located within the cover 18. The bushing 22 has three cutting grooves 22a provided at one end thereof, and has a notch 22b provided at another end thereof (as shown in FIG. 5). The cutting grooves 22a are extended from an edge of the bushing 22 in an axial direction, and each of the cutting grooves is passed through by an extending end of one of the pawls 20. A pivoting range of the corresponding pawl 20 is defined by a width of each of the cutting grooves 22a. The notch 22b of the bushing 22 is engaged with the prominent rib 142a of the revolving wheel 14. Referring to FIG. 5, a width of the notch 22b is greater than that of the prominent rib 142a, so that the bushing 22 could be only adequately rotated relative to the axial post 142 within a certain range. In other words, no matter the revolving wheel 14 is rotated forwards or backwards, it would be rotated relative to the bushing 22 over a somewhat short distance without having any effect; after that, the prominent rib 142a would push against one of two sidewalls of the notch 22b to start the rotation of the bushing 22.

The spring 24 fits around the bushing 22, wherein one end of the spring 24 pushes against an inner surface of the flange 12b of the base 12, while another end thereof goes into the notch 22b of the bushing 22, and hooks the prominent rib 142a. The spring 24 provides a force to the cover 18 to have a braking effect, so as to make the shade material 4 exactly stays at the position after accomplishing an operation without being further lowered by gravity. Since the spring 24 is a well-known component, it is not described in detail herein.

The structures and arrangements of the components of the control structure 10 in accordance with the first preferred embodiment of the present invention are described above, and the operation thereof is described below.

Figure 4:
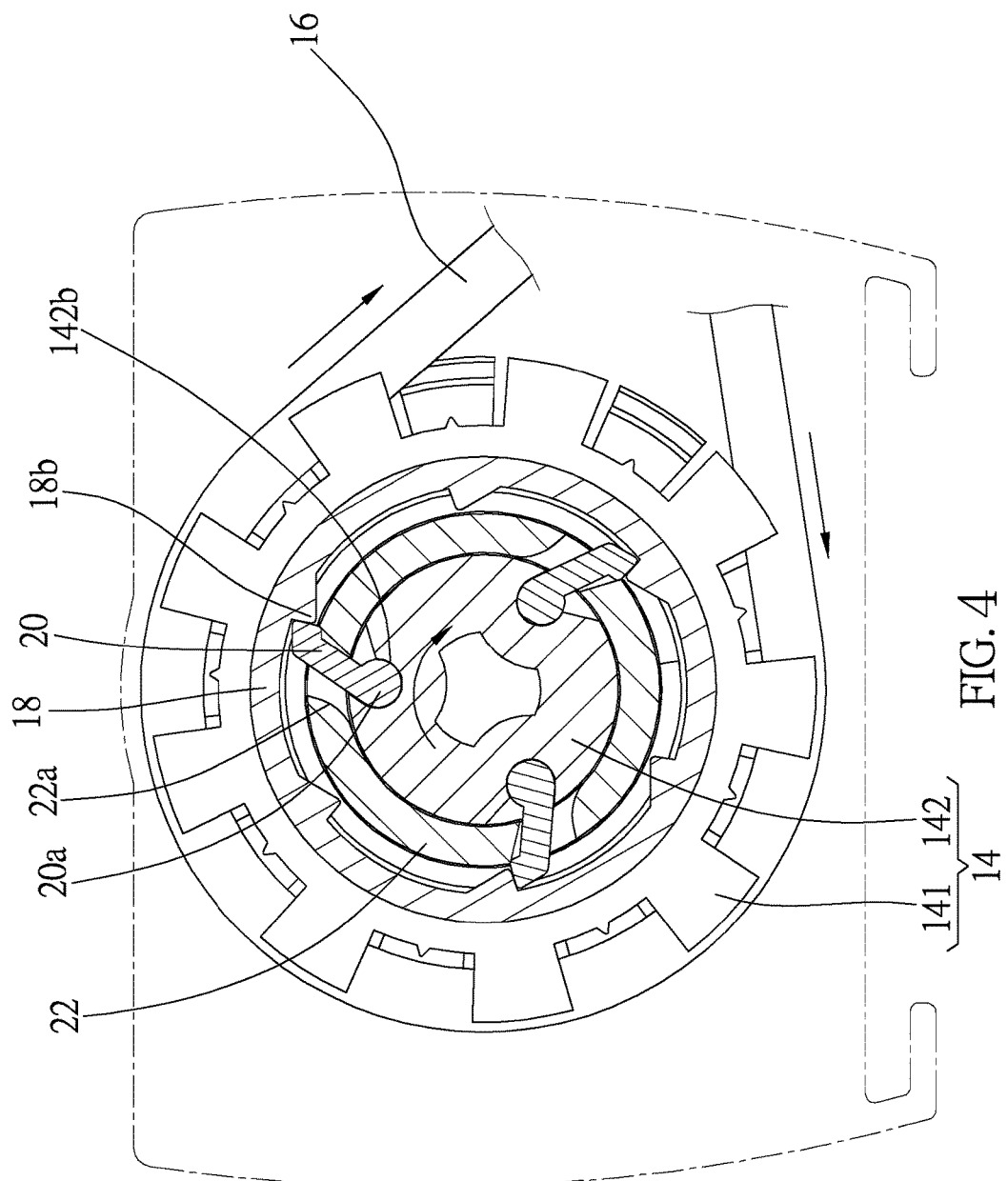
FIG. 4 is a sectional view along the 3-3 line in FIG. 3, which presents pawls mesh with abutting portions, while the revolving wheel is rotated forward by a rope.

Referring to FIG. 4 and FIG. 5, if the rope 16 is pulled to rotate the revolving wheel 14 forward (i.e., clockwise), and the prominent rib 142a abuts against one of the sidewalls of the notch 22b, by keeping pulling the rope 16, each of the pawls 20 would pivot following the rotation of the revolving wheel 14. As a result, the end of each of the pawls 20, which passes through one of the cutting grooves 22a, would mesh with the corresponding one-way tooth 18b, whereby the cover 18 and the shaft 5 are rotated forward together, and consequently, the lifting cords 7 would be wound around the reels 6 to move the bottom rail 3 toward the headrail 2 and to gradually collapse the shade material 4.

Figure 6:
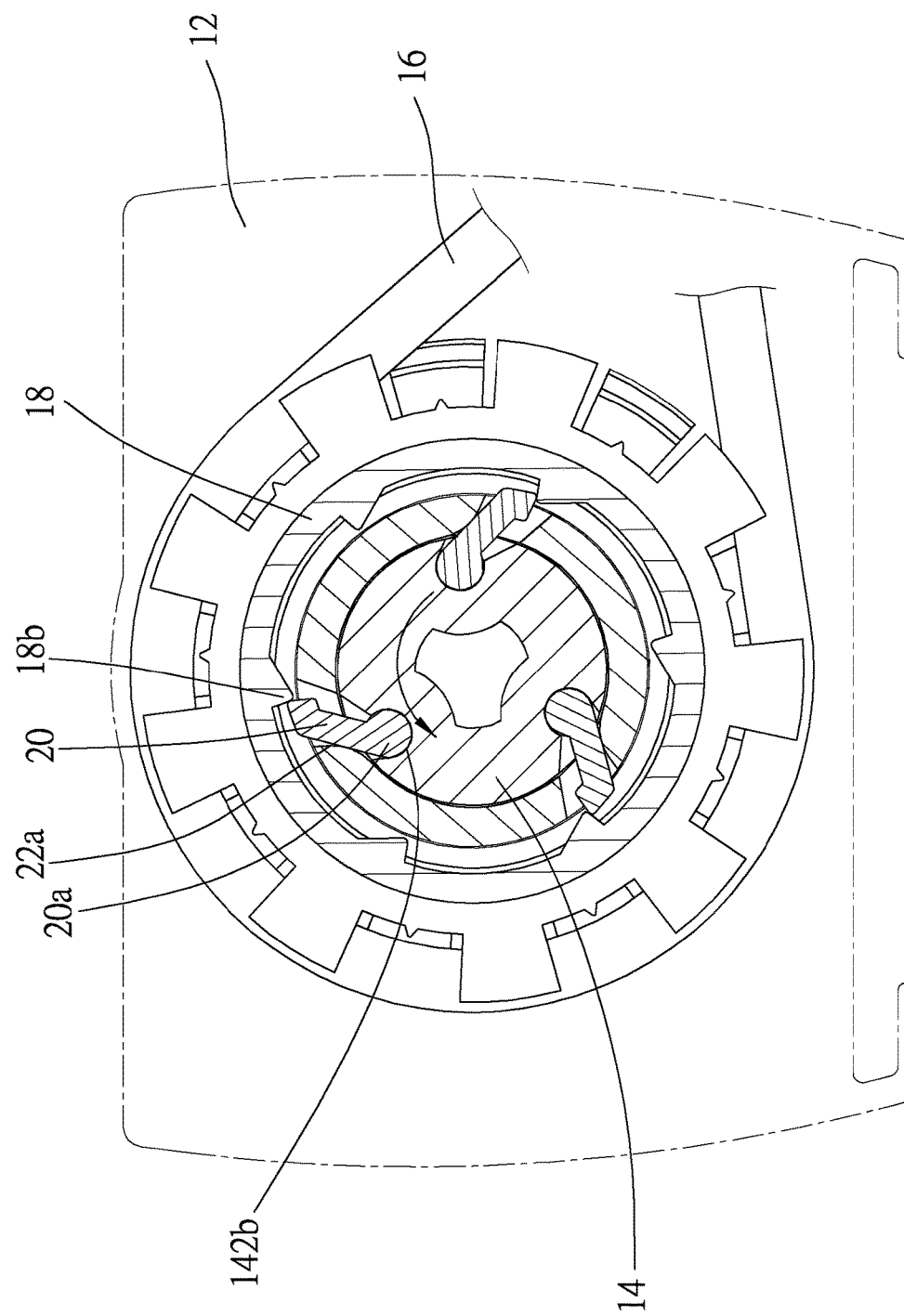
FIG. 6 is a sectional view which presents each of the abutting portions on the inner wall of the cover pushes the corresponding pawl to pivot and to abut against the sidewall of the corresponding cutting, while the cover is rotated due to the weight of the shade material through the shaft.
Figure 7:
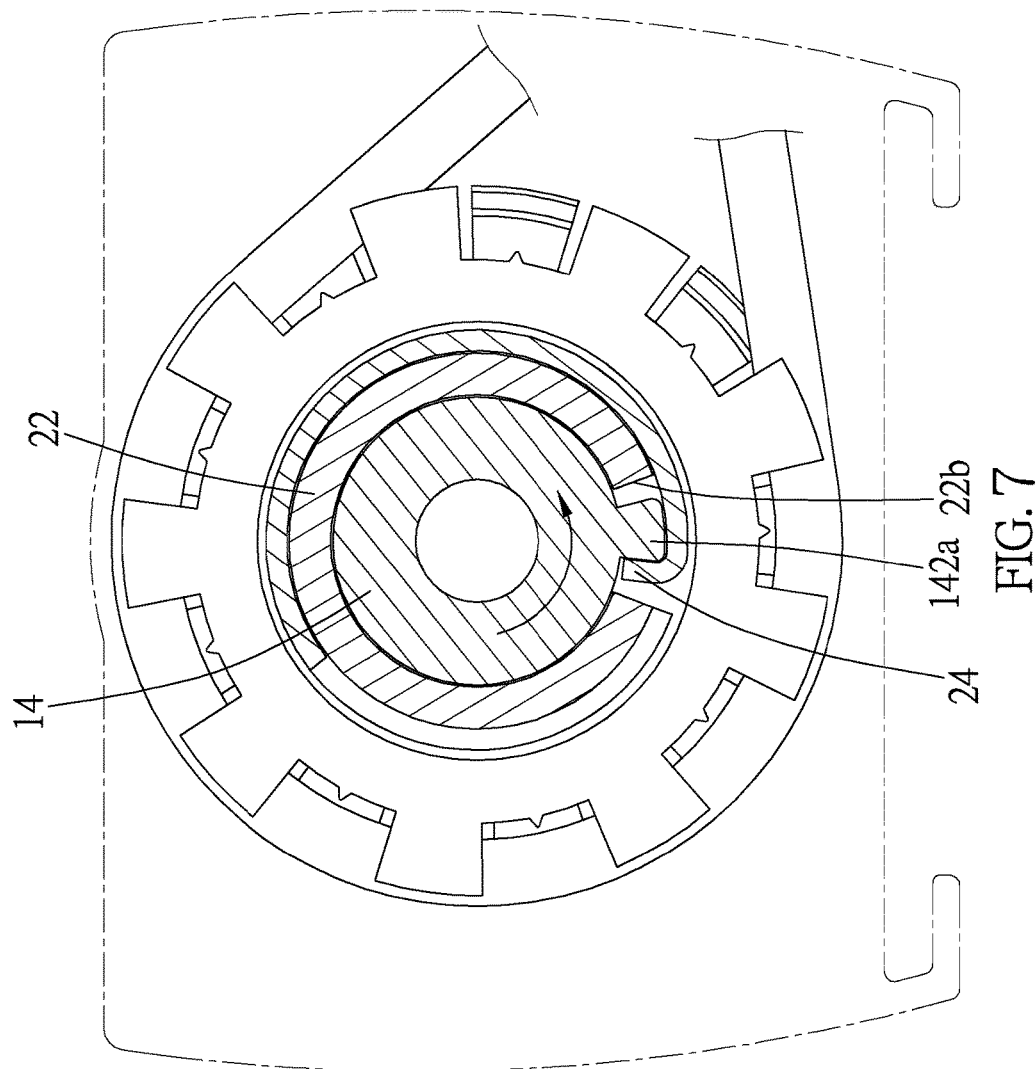
FIG. 7 is a sectional view which presents the revolving wheel is rotated together by pushing a cover.

Once the shade material 4 is completely collapsed, and the rope 16 is no longer being pulled, the weight of the shade material 4 would make the cover 18 rotates backward (i.e., counter-clockwise) through the shaft 5 by gravity. Referring to FIG. 6 and FIG. 7, when the cover 18 is rotated backward, the pawls 20 are pivoted to abut against a sidewall of the corresponding cutting groove 22a. At the same time, the revolving wheel 14 is also rotated backward, and the prominent rib 142a is moved, but does not abut against the other sidewall of the notch 22b. At this time, the revolving wheel 14 is in a stationary (i.e., non-rotating) state due to the damping effect provided by the spring 24 and other decelerating mechanisms (or dampers), so that the shade material 4 remains in a collapsed state.

Figure 8:
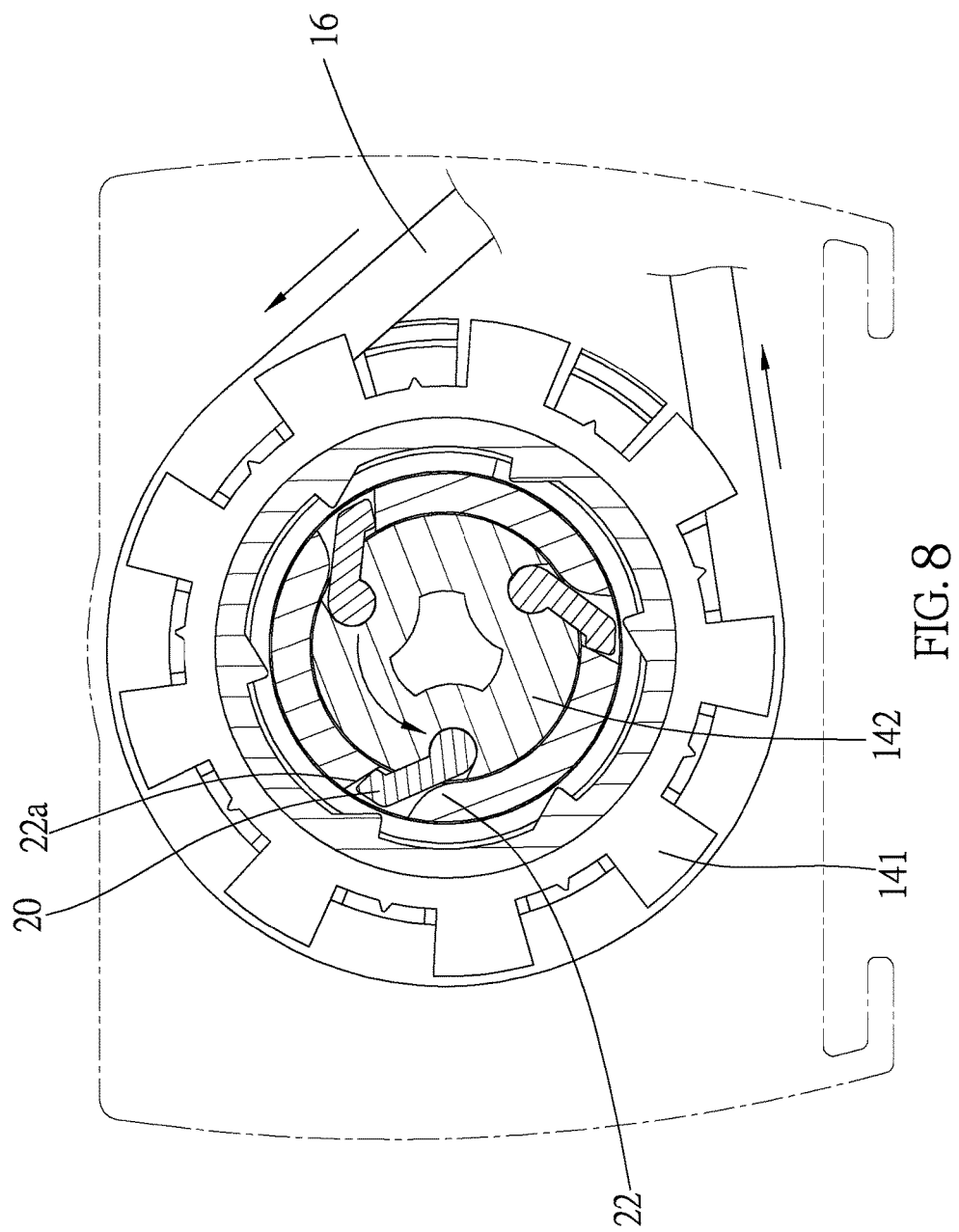
FIG. 8 is a sectional view which presents the pawls and the abutting portions do not mesh together, and the cover is rotatable relative to the revolving wheel, while the revolving wheel is rotated backward by the rope.
Figure 9:
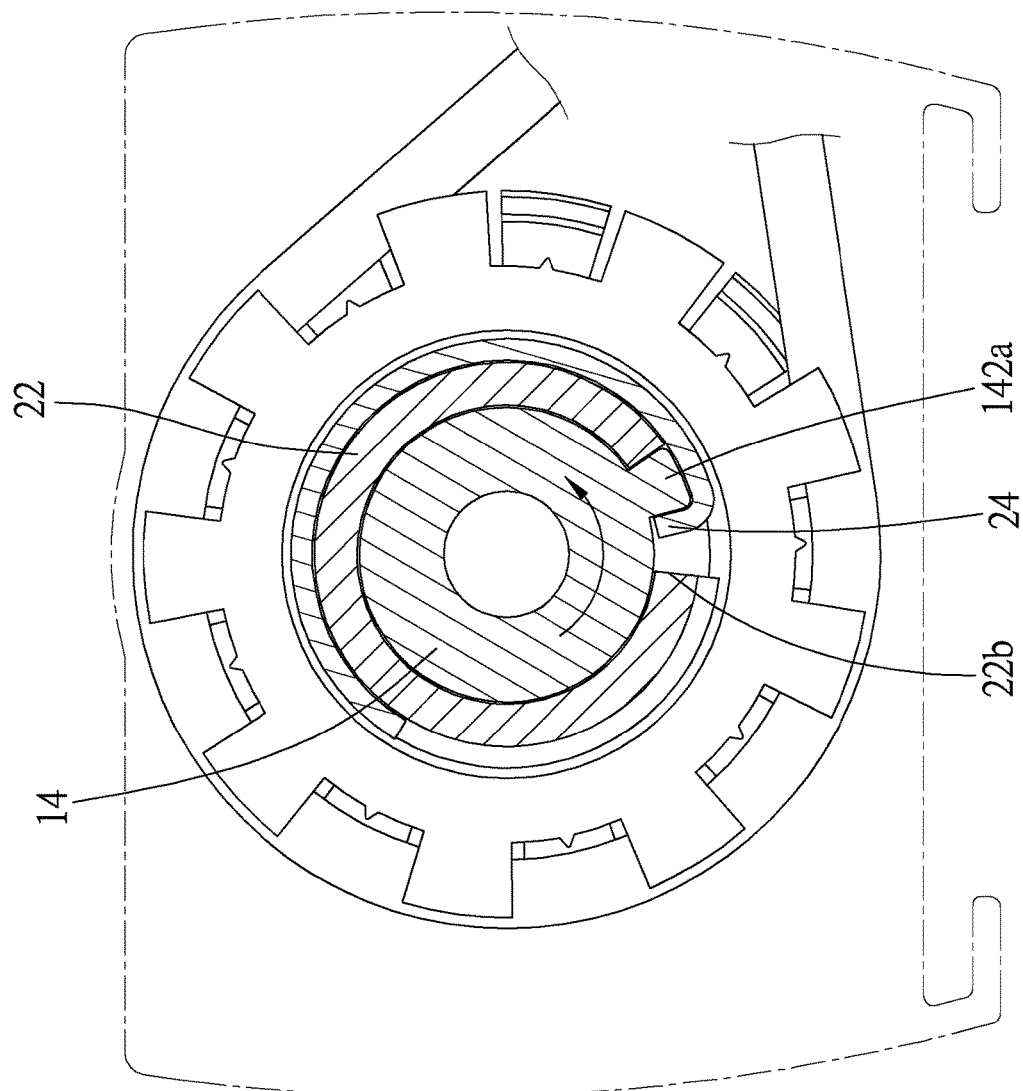
FIG. 9 is a sectional view which presents the prominent rib of the rotated revolving wheel is moved to abut against the other sidewall of the notch.

To expand the shade material 4, a user could slightly pull the rope 16 of the control structure 10 to make the revolving wheel 14 rotates backward, whereby the shade material 4 could naturally lower by its weight. Referring to FIG. 8 and FIG. 9, once another end of the rope 16 is pulled, and therefore the revolving wheel 14 starts to rotate backward, a user could stop pulling the rope 16. Meanwhile, the prominent rib 142a of the rotated revolving wheel 14 is moved to abut against the other sidewall of the notch 22b, and during the process, the revolving wheel 14 rotates over a longer distance than the bushing 22, which makes the pawls 20 goes into the cutting groove 22a, and the end of each of the pawls 20 which passes through the corresponding cutting groove 22a no longer meshes with one of the one-way teeth 18b. Since the user has stopped pulling the rope 16, the revolving wheel 14 is no longer rotated. However, the cover 18 still indirectly bears the weight of the shade material 4. As the cover 18 does not link up to the revolving wheel 14, it could keep freely rotating relative to the revolving wheel 14, and the reels 6 would release the lifting cords 7 as a result, which eventually reaches the purpose of expanding the shade material 4 downward. On the other hand, since each of the pawls 20 goes into one of the cutting grooves 22a, the pawls 20 would not pivot regardless of gravity, which prevents the pawls 20 from colliding with the cover 18 to generate noise, or falsely hooking the abutting portions to make a false operation.

Figure 10:
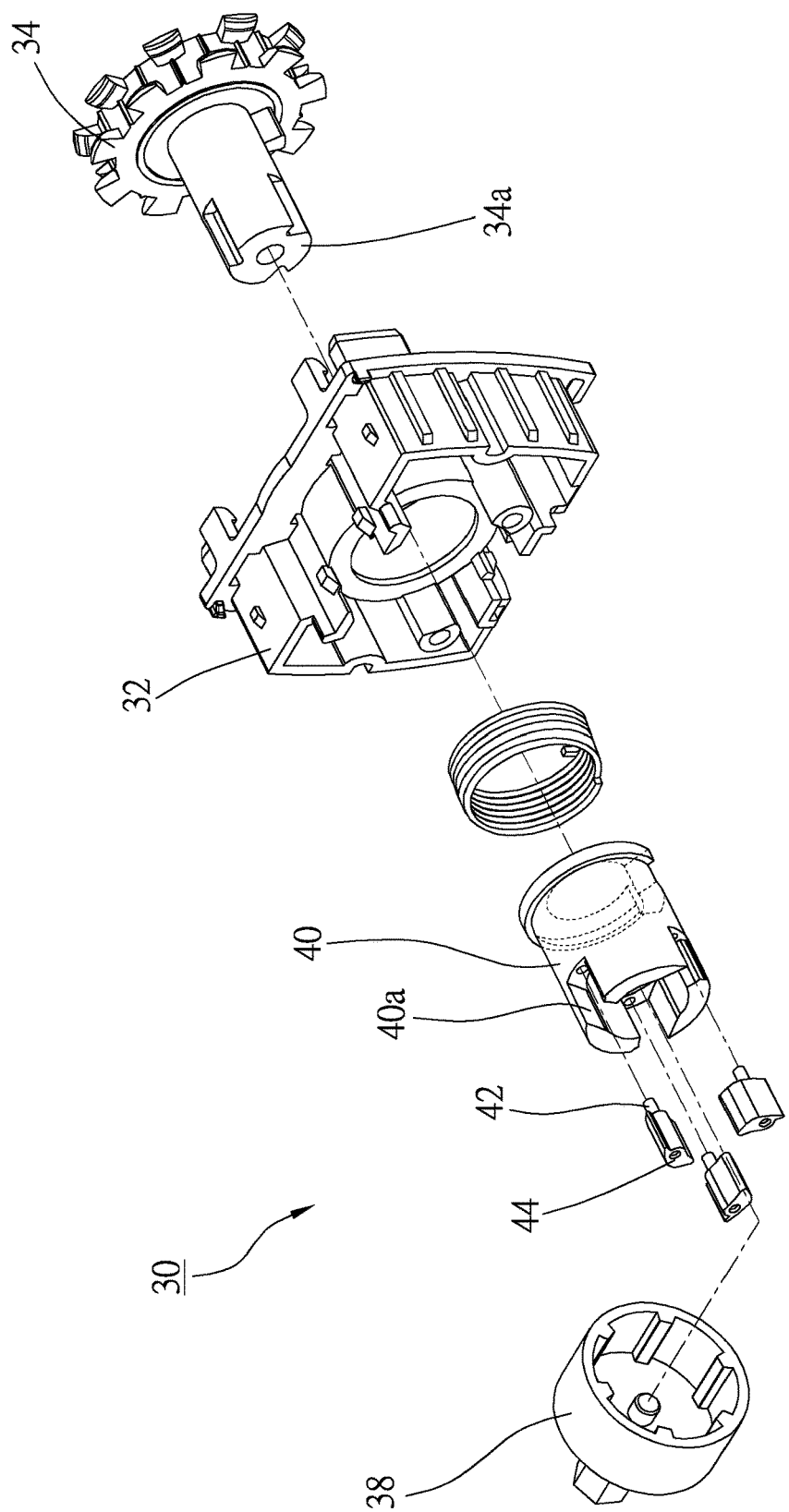
FIG. 10 is an exploded view of a control structure according to a second preferred embodiment of the present invention.

A control structure 30 according to the second preferred embodiment of the present invention is illustrated in FIG. 10, which is applied to the aforementioned window covering 1 as well. The control structure 30 is same as the first preferred embodiment, which also includes a base 32, a revolving wheel 34, a rope 36, a transmission member being a cover 38 as an example, a restriction means being a bushing 40 as an example, and a spring. The differences between the first and the second preferred embodiments are that, the cover 38 has three abutting portions being protuberances 38a as examples provided therein, and further has three axial members 42. Furthermore, each of three pawls 44 according to the second preferred embodiment has a guide portion 44a and a mesh portion 44b which are formed on opposite ends of each of the pawls 44. Each of the pawls 44 is pivotally provided in one of three cutting grooves 40a of the bushing 40 through the corresponding axial member 42, so that each of the pawls 44 could be completely received in one of the cutting grooves 40a to pivot therein, with only two ends thereof could be respectively exposed out of the corresponding cutting groove 40a. More specifically, each of the axial members 42 is located closer to the corresponding mesh portion 44b than to the corresponding guide portion 44a. In this way, each of the pawls 44 would pivot backward, since one side thereof closer to the guide portion 44a is heavier than another side thereof closer to the mesh portion 44b.

The structures and arrangements of the components of the control structure 30 according to the second preferred embodiment of the present invention are described above, and the operation thereof is described below.

Figure 11:
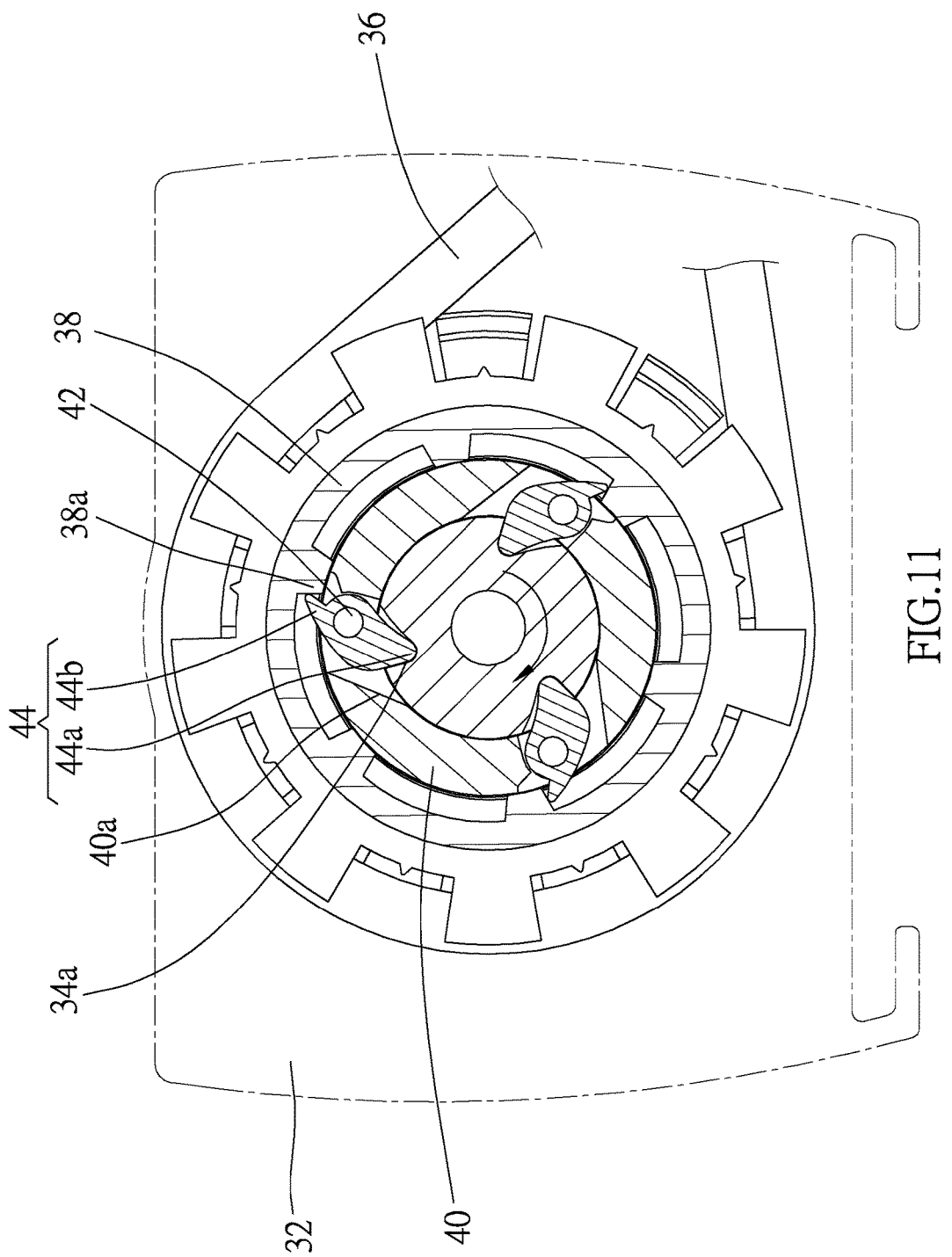
FIG. 11 is a sectional view which presents a mesh portion of each of pawls meshes with one of abutting portions, while a revolving wheel is rotated forward by a rope.

Referring to FIG. 11, the guide portion 44a of each of the pawls 44 would enter one of the engaging grooves 34a of the revolving wheel 34, while the revolving wheel 34 is rotated forward by pulling the rope 36. And once the revolving wheel 34 is rotated forward over a longer distance than the bushing 40 is, each of the pawls 44 would be moved along with the rotation of the revolving wheel 34, and eventually, each of the mesh portions 44b meshes with one of the protuberances 38a of the cover 38. Consequently, the cover 38 and the axial members 42 are moved forward together, and the shade material 4 is collapsed as a result.

Figure 12:
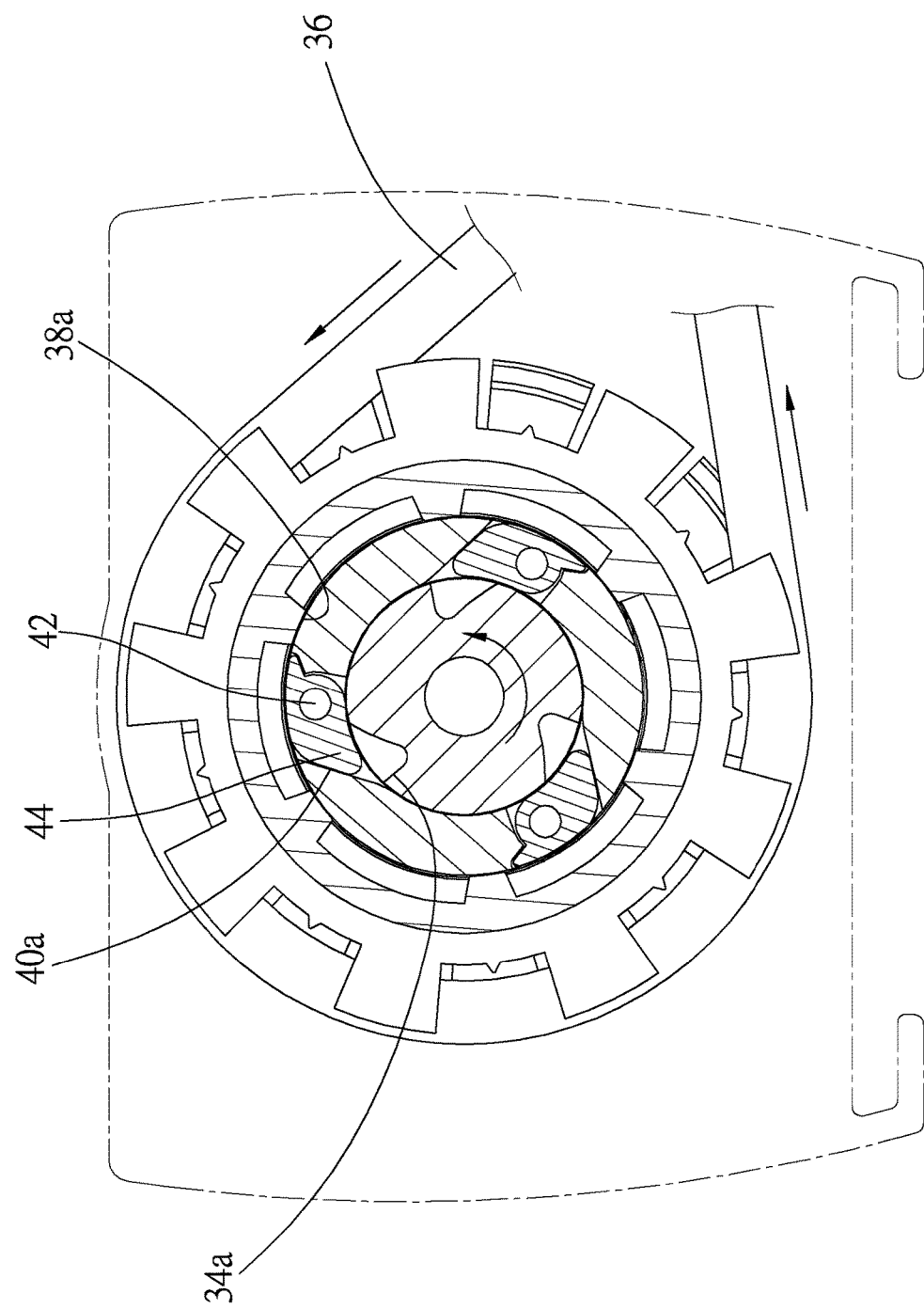
FIG. 12 is a sectional view which presents the mesh portion of each of the pawls does not mesh with one of the abutting portions, and therefore a cover is rotatable relative to the revolving wheel, while the revolving wheel is rotated backward by the rope.

Referring to FIG. 12, to expand the shade material 4, the revolving wheel 34 should be rotated backward by slightly pulling the rope 36 in an opposite direction, as described in the first preferred embodiment. Once the revolving wheel 34 is rotated backward over a longer distance than the bushing 40 is, a sidewall of each of the engaging grooves 34a pushes against the corresponding guide portion 44a to make each of the pawls 44 pivot forward to a position where each of the pawls 44 is completely received in the corresponding cutting groove 40a. Meanwhile, each of the guide portions 44a leaves the corresponding engaging groove 34a, and each of the mesh portions 44b does not mesh with one of the protuberances 38a, whereby the cover 38 is rotated freely relative to the revolving wheel 34 by the weight of the shade material 4 through the shaft 5, and consequently, the shade material 4 is expanded. At this time, since each of the pawls 44 is not pulled against by one of the engaging grooves 34a of the revolving wheel 34, each of the pawls does not pivot regardless of gravity.

Figure 13:
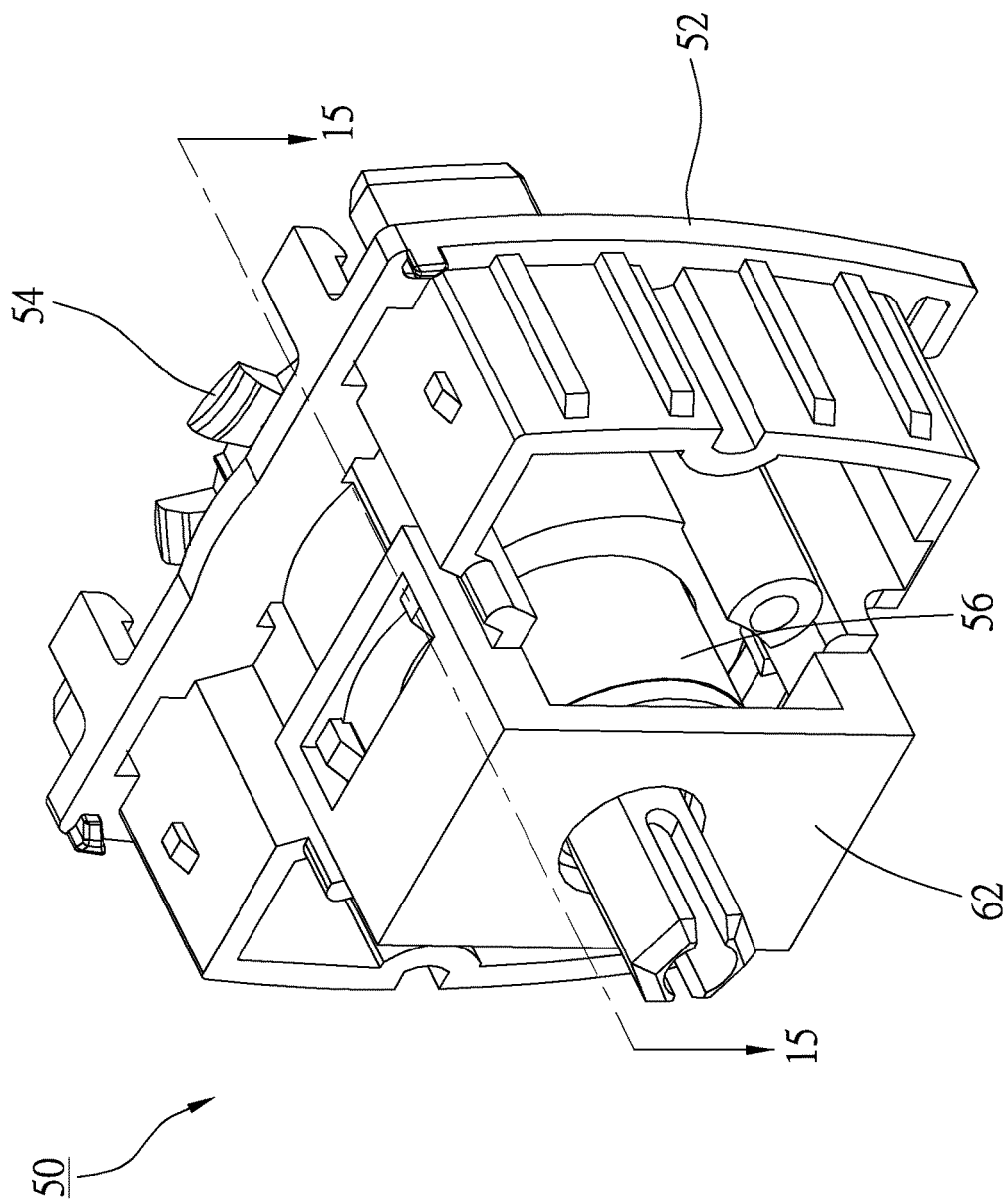
FIG. 13 is a perspective view of a control structure according to a third preferred embodiment of the present invention.
Figure 14:
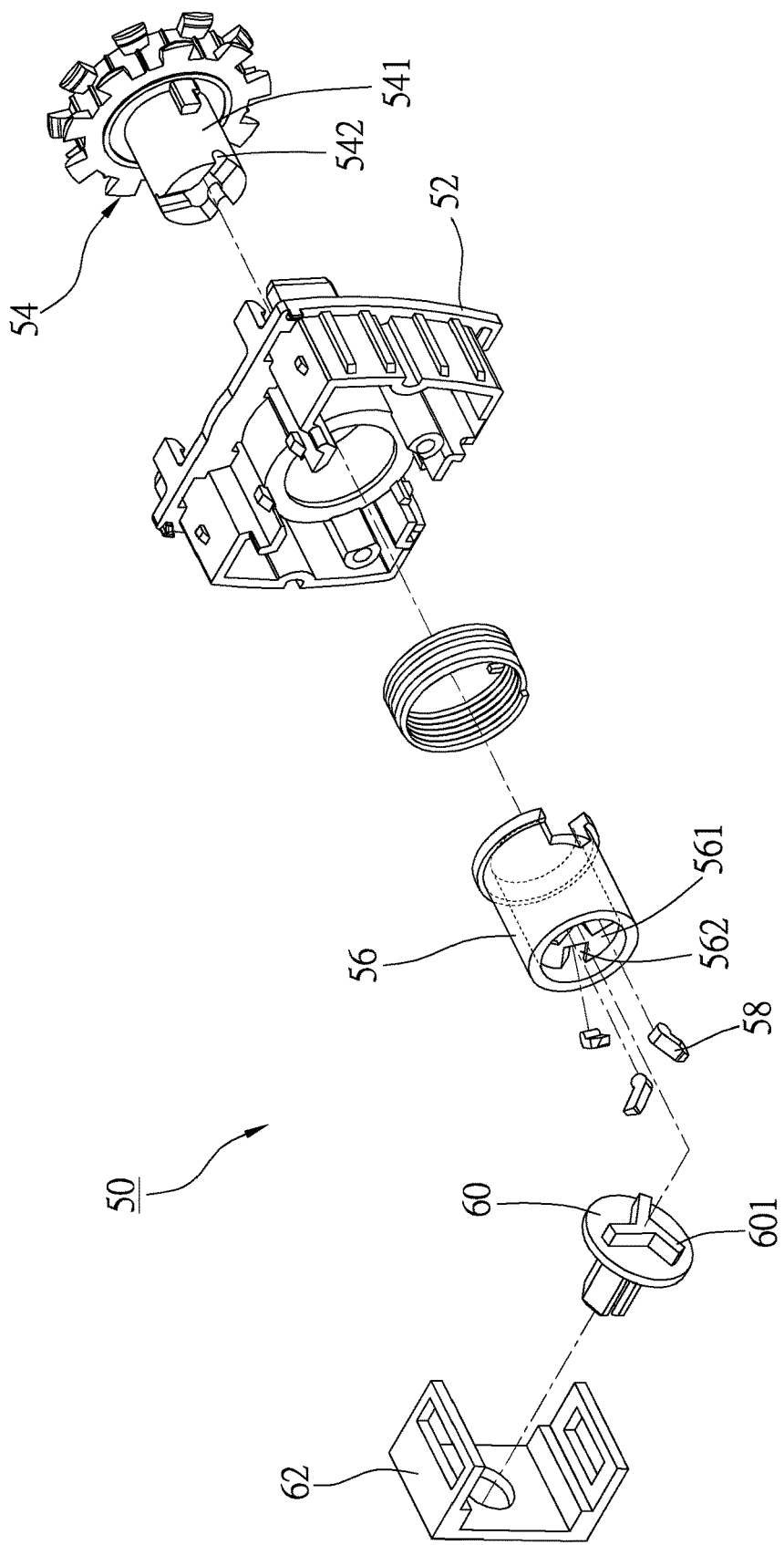
FIG. 14 is an exploded view which presents the control structure in FIG. 13.

A control structure 50 of the third preferred embodiment of the present invention is illustrated in FIG. 13 and FIG. 14, which is applied to the aforementioned window covering 1, and also includes a base 52, a revolving wheel 54, a restriction means being a bushing 56 as an example, and a transmission member.

Figure 15:
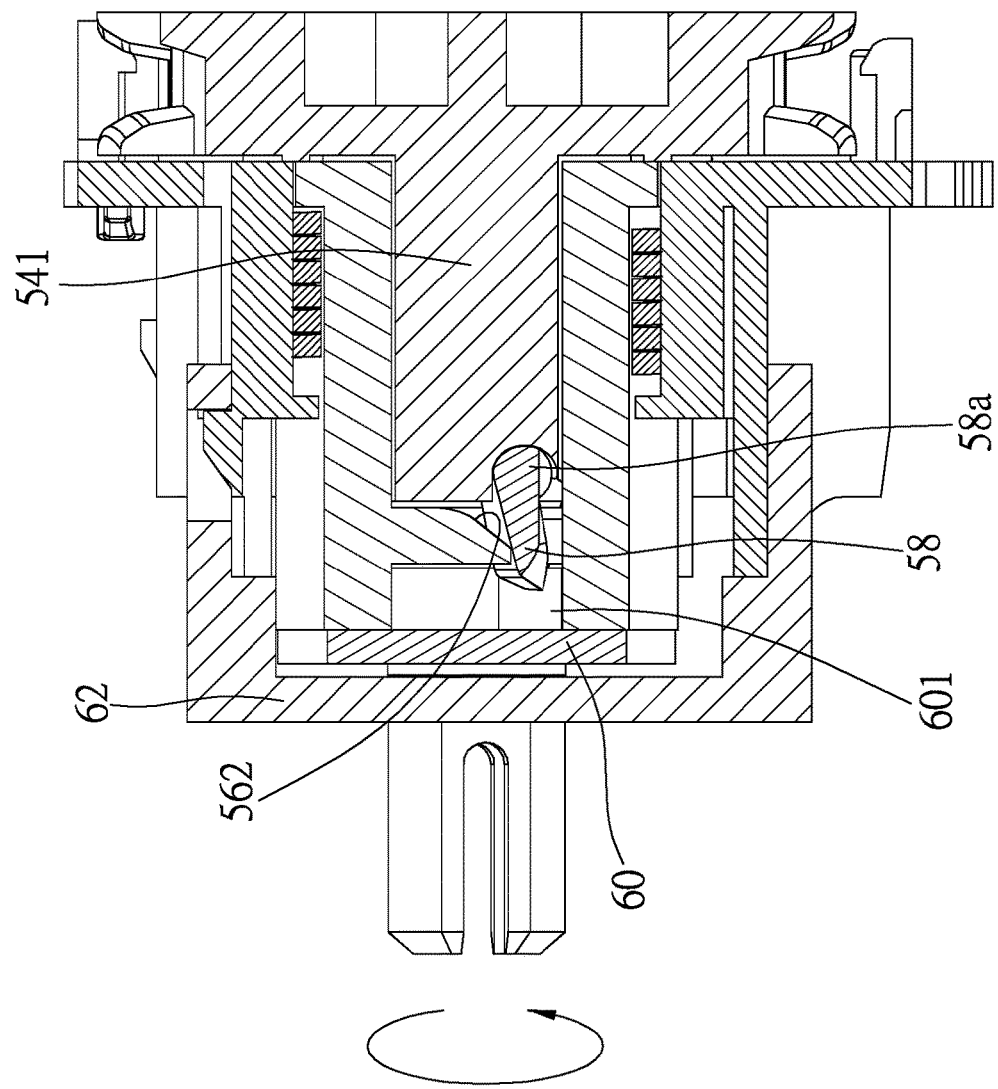
FIG. 15 is a sectional view along the 15-15 line in FIG. 13, which presents pawls are engaged with ribs of transmission member, while the revolving wheel is rotated forward.

Referring to FIG. 15 and FIG. 16, each of three engaging grooves 542 on an axial post 541 of the revolving wheel 54 has a curved bottom. Each of the pawls 58 has a root 58a provided in one of the engaging grooves 542, and the shape of each of the roots 58a matches the curved bottom of the corresponding engaging groove 542. The differences between the third preferred embodiment and the previous two preferred embodiments are that, each of the engaging grooves 542 is recessed into an end surface of the axial post 541, whereby the pawl 58 pivotally provided in each of the engaging grooves 542 has a pivoting direction, which is different from that of any of the previous two preferred embodiments. The bushing 56 fits around the axial post 541, and the bushing 56 further has a top plate 561 provided on an inner wall thereof, wherein the top plate 561 has three bores 562. Each of the pawls 58 fits in one of the bores 562, and is pivotable within a width of the corresponding bore 562. In other words, an inner wall of each of the bores 562 defines a pivoting range of the corresponding pawl 58.

In addition, the transmission member is a rotating plate 60 as an example in the third preferred embodiment, wherein the rotating plate 60 is fixed by a supporting member 62, and is located on a side of the bushing 56. The rotating plate 60 has three abutting portions on a side thereof, wherein the abutting portions are three ribs 601 in the third preferred embodiment. Further, the supporting member 62 is connected to two different locations on the base 52.

With the structures mentioned above, each of the pawls 58 would be pivoted since the root 58a thereof is pivotally provided on the axial post 541, while the revolving wheel 54 is rotated by control (e.g., by the rope mentioned in the previous preferred embodiments). Referring to FIG. 15, when the revolving wheel 54 is rotated forward, another opposite end of each of the pawls 58 would extend and pass through one of the bores of the top plate 561 to engage with one of the ribs 601. In this way, the rotating plate 60 could be rotated forward together to rotate the shaft 5 and to, consequently, collapse the shade material 4.

When the revolving wheel 54 is rotated backward by controlling, and which is rotated over a longer distance than the bushing 56 is, each of the pawls 58 would go into one of the bores 562 of the top plate 561, and disengages from the corresponding rib 601. In this way, the rotating plate 60 bearing the weight of the shade material 4 through the shaft 5 would be freely rotated relative to the revolving wheel 54, and the rotating plate 60 consequently expands the shade material 4.

In summary, for each of the control structures 10, 30, 40 individually according to the first, the second, and the third preferred embodiments of the present invention, the end of each of the pawls would perfectly mesh with the corresponding abutting portion, while the revolving wheel is rotated forward by pulling the rope. Therefore, with the restriction effect provided by the cutting grooves (or the bores) of the bushing, there would be no annoying noise generated during the process of collapsing the shade material 4. Furthermore, the pawls would neither accidentally mesh with nor disengage from the abutting portions. On the other hand, when the revolving wheel is rotated backward by pulling the rope, and is rotated over a longer distance than the bushing is, the pawls would go into the cutting grooves (or the bores) of the bushing and no longer contact with the cover. In other words, the noise, which may be generated during the process of expanding or collapsing the window covering 1, could be effectively reduced. Furthermore, the reliability of the pawl-related components could be increased as well.

It must be pointed out that the embodiments described above are only some preferred embodiments of the present invention. All equivalent structures which employ the concepts disclosed in this specification and the appended claims should fall within the scope of the present invention.

What is claimed is:

1. A control structure for raising and lowering a window covering which includes a headrail, a bottom rail, and a shade material, wherein the shade material is provided between the headrail and the bottom rail, and is expanded or collapsed by a shaft provided in the headrail; the control structure comprising:
a base provided in the headrail;
a revolving wheel connected to the base, wherein the revolving wheel is rotatable forwards and backwards, and has an axial post;
a transmission member connected to the shaft and provided on the axial post, wherein the transmission member has an abutting portion on a wall thereof;
a pawl pivotally provided between the transmission member and the axial post; and
a restriction means, positioned between the transmission member and the axial post of the revolving wheel, allowing the pawl to mesh with the abutting portion or to disengage from the abutting portion;

wherein, when the revolving wheel is rotated forward, the pawl pivots until the pawl meshes with the abutting portion and continues meshing with the abutting portion through the restriction means; and when the revolving wheel is rotated backward, the pawl pivots until the pawl disengages from the abutting portion and remains disengaged from the abutting portion through the restriction means.

2. The control structure of claim 1, wherein the transmission member comprises a cover; the restriction means comprises a bushing provided in the cover and fitting around the axial post, wherein the bushing has a cutting groove; one end of the pawl is pivotally provided on the axial post, while another end of the pawl extends thereof and passes through the cutting groove; wherein, when the revolving wheel is rotated forward, the pawl pivots until the another end of the pawl passes through the cutting groove, and the another end of the pawl continues meshing with the abutting portion; when the revolving wheel is rotated backward over a longer distance than the bushing is, the pawl pivots into the cutting groove, and the another end of the pawl disengages from the abutting portion and remains disengaged so that the cover is freely rotated relative to the revolving wheel by a weight of the shade material through the shaft.

3. The control structure of claim 2, wherein the axial post of the revolving wheel has an engaging groove, wherein the engaging groove has a curved bottom; the pawl has a root located in the engaging groove, and a shape of the root matches a shape of the curved bottom of the engaging groove, so that the pawl is adapted to pivot within a width of the cutting groove, and whereby the another end of the pawl operably extends to pass through the cutting groove.

4. The control structure of claim 2, wherein the bushing further has a notch; the axial post of the revolving wheel has a prominent rib provided thereon; the prominent rib engages with the notch of the bushing, and pushes against one of two sidewalls of the notch along with a forwards or backwards rotation of the revolving wheel to rotate the bushing.

5. The control structure of claim 4, further comprising a spring fitting around the bushing, wherein the base has an axial bore, and the axial post of the revolving wheel passes through the axial bore; the axial bore of the base has a flange at a front edge thereof; one end of the spring pushes against the flange, while another end thereof extends into the notch to hook the prominent rib.

6. The control structure of claim 1, wherein the transmission member comprises a cover; the restriction means comprises a bushing provided in the cover and fitting around the axial post, wherein the bushing has a cutting groove; the axial post of the revolving wheel has an engaging groove; the pawl is pivotally provided on the bushing, and is adapted to pivot in the cutting groove; the pawl has a guide portion and a mesh portion on two opposite sides thereof; wherein, when the revolving wheel is rotated forward, the pawl pivots until the guide portion and the mesh portion extend through the cutting groove, the guide portion of the pawl stays in the engaging groove and the mesh portion of the pawl continues meshing with the abutting portion so that rotation of the revolving wheel rotates the cover; when the revolving wheel is rotated backward for a longer distance than the bushing is, the pawl pivots so that the guide portion and the mesh portion of the pawl enter the cutting groove, the guide portion of the pawl leaves the engaging groove, and the mesh portion disengages from the abutting portion; the cover bearing the weight of the shade material through the shaft is freely rotated relative to the revolving wheel at this time.

7. The control structure of claim 6, wherein the bushing further has a notch; the axial post of the revolving wheel has a prominent rib provided thereon; the prominent rib engages with the notch of the bushing, and pushes against one of two sidewalls of the notch along with a forwards or backwards rotation of the revolving wheel to rotate the bushing.

8. The control structure of claim 7, further comprising a spring fitting around the bushing, wherein the base has an axial bore, and the axial post of the revolving wheel passes through the axial bore; the axial bore of the base has a flange at a front edge thereof; one end of the spring pushes against the flange, while another end thereof extends into the notch to hook the prominent rib.

9. The control structure of claim 6, wherein the pawl is pivotally provided on the bushing through an axial member, wherein the axial member is located closer to the mesh portion than to the guide portion.

10. The control structure of claim 1, wherein the transmission member comprises a rotating plate, and one side of the rotating plate has a rib formed as the abutting portion; the restriction means comprises a bushing located on the side of the rotating plate, wherein the bushing includes a bore corresponding to the rib; one end of the pawl is pivotally provided on the axial post, while another end thereof operably extends and passes through the bore; when the revolving wheel is rotated forward the pawl pivots until the another end of the pawl passes through the bore and engages the rib; when the revolving wheel is rotated backward over a longer distance than the bushing is, the pawl pivots until another end of the pawl enters the bore and disengages from the rib so that the rotating plate bearing the weight of the shade material through the shaft is rotated freely relative to the revolving wheel.

11. The control structure of claim 10, wherein the axial post of the revolving wheel has an engaging groove recessing into one end surface of the axial post and having a curved bottom; an inner wall of the bushing has a top plate provided thereon; the bore is provided on the top plate; the pawl has a root located in the engaging groove, and a shape of the root matches a shape of the curved bottom of the engaging groove, so that the pawl is adapted to pivot within a width of the bore, and thereby the another end of the pawl is operably extended to pass through the bore.

12. The control structure of claim 11, wherein the bushing further has a notch; the axial post of the revolving wheel has a prominent rib provided thereon; the prominent rib engages with the notch of the bushing, and pushes against one of two sidewalls of the notch along with a forwards or backwards rotation of the revolving wheel to rotate the bushing.

* * * * *